United States Patent
Smith

(10) Patent No.: US 7,280,737 B2
(45) Date of Patent: Oct. 9, 2007

(54) METHOD AND APPARATUS FOR DISCOURAGING COMMERCIAL SKIPPING

(75) Inventor: Wayne M. Smith, La Cañada, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 67 days.

(21) Appl. No.: 11/063,790

(22) Filed: Feb. 22, 2005

(65) Prior Publication Data

US 2005/0185919 A1    Aug. 25, 2005

Related U.S. Application Data

(60) Provisional application No. 60/546,836, filed on Feb. 23, 2004.

(51) Int. Cl.
  H04N 5/76    (2006.01)
  H04N 7/00    (2006.01)
  H04N 9/64    (2006.01)

(52) U.S. Cl. .................. 386/46; 386/95; 348/907

(58) Field of Classification Search ............ 386/1, 386/46, 80; 358/907; 725/34, 42, 68
See application file for complete search history.

(56) References Cited

U.S. PATENT DOCUMENTS

| | | | | |
|---|---|---|---|---|
| 5,343,521 A | * | 8/1994 | Jullien et al. | 379/406.07 |
| 5,987,210 A | * | 11/1999 | Iggulden et al. | 386/46 |
| 5,999,689 A | | 12/1999 | Iggulden | |
| 6,002,393 A | * | 12/1999 | Hite et al. | 715/719 |
| 6,100,941 A | * | 8/2000 | Dimitrova et al. | 348/700 |
| 6,101,310 A | * | 8/2000 | Terada et al. | 386/68 |
| 6,275,646 B1 | * | 8/2001 | Tada et al. | 386/46 |
| 6,651,253 B2 | | 11/2003 | Dudkiewicz et al. | |
| 6,698,020 B1 | * | 2/2004 | Zigmond et al. | 725/34 |
| 6,819,863 B2 | | 11/2004 | Dagtas et al. | |
| 6,909,837 B1 | * | 6/2005 | Unger | 386/68 |
| 2002/0144262 A1 | | 10/2002 | Plotnick et al. | |
| 2002/0191950 A1 | | 12/2002 | Wang | |
| 2003/0037330 A1 | * | 2/2003 | Makofka | 725/32 |
| 2003/0088872 A1 | * | 5/2003 | Maissel et al. | 725/46 |
| 2003/0159153 A1 | | 8/2003 | Falvo et al. | |
| 2003/0202772 A1 | | 10/2003 | Dow et al. | |
| 2003/0226150 A1 | * | 12/2003 | Berberet et al. | 725/94 |
| 2004/0003405 A1 | | 1/2004 | Boston et al. | |
| 2004/0228605 A1 | * | 11/2004 | Quan et al. | 386/46 |

FOREIGN PATENT DOCUMENTS

| | | |
|---|---|---|
| JP | 8096442 | 4/1996 |
| WO | WO 02/01866 | 1/2002 |
| WO | WO 2004/036870 | 4/2004 |

\* cited by examiner

*Primary Examiner*—Mehrdad Dastouri
*Assistant Examiner*—Gelek Topgyal
(74) *Attorney, Agent, or Firm*—Gottlieb, Rackman & Reisman, P.C.

(57) ABSTRACT

A program includes sequential program segments, commercial segments, segment dividers delimiting the program and commercial segments and extraneous signals inserted into the segments. The extraneous signals are selected to mimic segment dividers and thus discourage recording of the program by a commercial skipping recorder device.

18 Claims, 3 Drawing Sheets

METHOD AND APPARATUS FOR DISCOURAGING COMMERCIAL SKIPPING

RELATED APPLICATIONS

This application claims priority to U.S. Provisional Application Ser. No. 60/546,836 filed Feb. 23, 2004 and incorporated herein by reference.

BACKGROUND OF THE INVENTION

A. Field of the Invention

This invention relates to a method and apparatus for inserting extraneous signals in broadcast programs selected to mimic segment dividers delimiting program and commercial segments and are calculated to discourage commercial skipping.

B. Background of the Invention

Video Cassette Recorders (VCRs) and Digital Video Recorders (DVRs) are well known devices that are used to record a broadcast program for time shifting. The term 'broadcast program' is used herein broadly to cover audio and video presentations that are transmitted by broadcasters, such as the major networks, to individual viewers over the air, by cable, satellite or any other means, including fixed media. VCRs record broadcast programs as analog signals on a magnetic tape. Digital video recorders compress the programs using known algorithms, such as MPEG, and then store them on a digital storage media.

During replay, commercials can be skipped by the viewers manually by using a FAST FORWARD button or other similar means present on all recorders. However, devices have been suggested that perform commercial skipping automatically. Examples of such devices are disclosed in U.S. Patent Application Publication US 2003/0202772 published on Oct. 30, 2003, PCT International Publication No. WO 98/07273 published on Feb. 19, 1998 and U.S. Pat. No. 5,151,788 issued on Sep. 29, 1992, each of which is incorporated herein by reference. As discussed in US 2003/0202772, a typical broadcast program consists of a series of program segments and commercial segments separated from the program segments by segment dividers. The commercial segments may consist of advertising or other content not directly related to the program segments. Typically, segment dividers consist of dark frames (also called "black fields"). Some commercial skipping devices include means of detecting the segments by measuring the luminescence of video frames and identifying the "black fields" or segment dividers, and determining the temporal distance between groups of such dividers. Other commercial skipping systems locate commercial segments by detecting audio dropouts or the presence of stereo audio (where the program segments are not broadcast in stereo due to the use of the second audio program, i.e. SAP, to broadcast either in a second language or with alternative audio content). The device can replay recorded programs in several modes selected by a viewer. In one mode, all the commercial segments are skipped.

Of course, commercials represent an important source of revenue for the broadcasters. If the viewers have the ability to skip the commercials, then the value of these commercials will be greatly diminished and therefore, commercials may cease to be an important source of revenue. As a result, broadcasters may be forced to charge the viewers for what are now "free" television programs, using a subscription service, like HBO, a pay-per-view service, or other similar means. Alternatively, the broadcasters will have to fund the programs through private contributions and/or state funding, like PBS or by obtaining revenues through product placements within the programming itself. None of these funding means are particularly attractive to either the viewers, or the broadcasters.

However, if viewers are discouraged from commercial skipping, then the alternate means of funding programs may not be necessary.

DETAILED DESCRIPTION OF THE INVENTION

Figure 1:
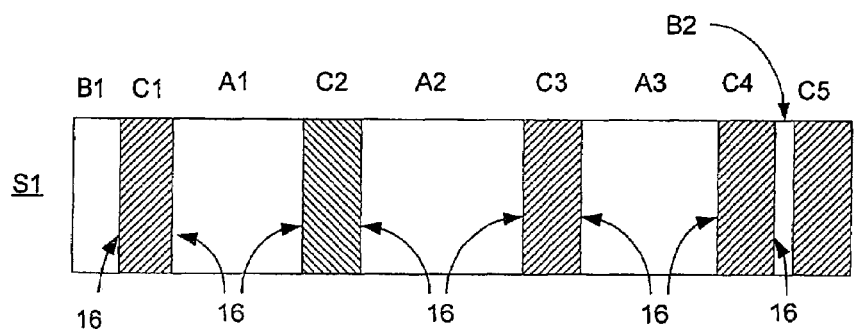
FIG. 1 shows a temporal sequence of the components of a typical broadcast program.

FIG. 1 shows a typical 30-minute broadcast program consisting of a sequence S1 of segments including program and commercial segments. The program starts with program segment B1 consisting of the opening scenes and credits. The next segment is a commercial segment C1 that consists of a first group of commercials. The following segment A1 is the first act of the program. Next, there is a second commercial segment C2 with another group of commercials. The following segment A2 is the second act of the program. Next is commercial segment C3 consisting of a third group of commercials. The next segment A3 contains the third or final act, followed by a commercial segment C4 with a fourth group of commercials. The program ends with the program segment B2 consisting of the closing credits and possibly a preview of future episodes and another commercial segment C5 with a fifth group of commercials. These segments are separated from each other by segment dividers 16 that consist of black fields in the visual portion of the program, as discussed above.

Each commercial segment C1, C2 . . . C5 can include a group of commercials separated by respective segment dividers as well. These segment dividers have been omitted for the sake of clarity.

Programs that are longer (such as 90 minutes, 120 minutes, etc.) or shorter than 30 minutes also consist of sequences of program and commercial segments and can be treated or processed in a similar manner. Moreover, the order and number of segments may also be changed within a sequence. For example, in many instances, a program may start with a program segment consisting of an opening scene that precedes the opening credits. The present invention is easily adapted to all these sequences as well.

As seen in FIG. 1, the various segments of the sequence S1 can be identified from their respective positions and/or lengths. Thus, the first segment of the program corresponds to segment B1. The first long segment corresponds to the first scene of segment A1, and so forth.

Figure 2:
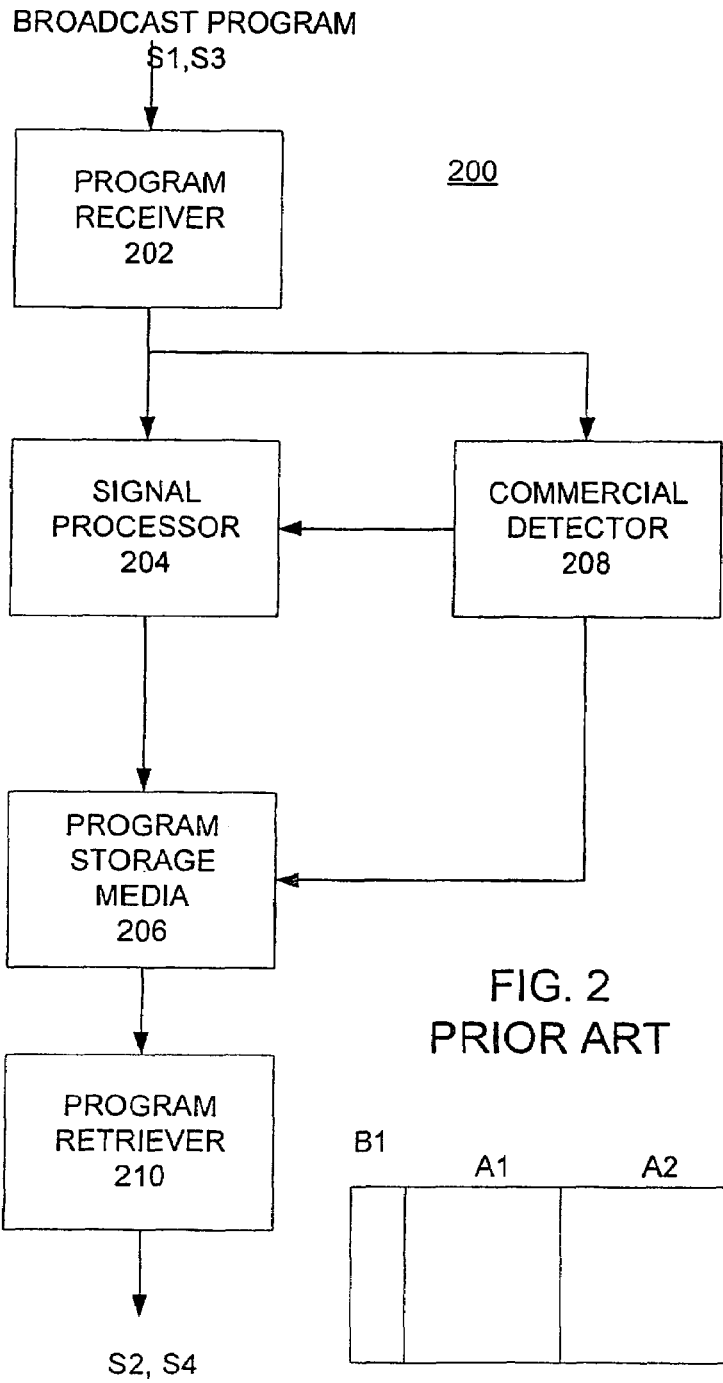
FIG. 2 shows a block diagram of a known recording device with the ability to selectively skip commercials.

FIG. 2 shows a known recorder 200 (such as the one described above) that is capable of a mode of operation in which a recorded program is replayed without at least some, or all the commercial segments C in sequence S1. The recorder 200 has a program receiver 202 that receives a broadcast program, a signal processor 204 that manipulates or transforms the received broadcast program so that it can be stored, and a program storage media 206 typically used to store several programs. Recorder 200 also includes a commercial detector 206 that detects the commercial segments C1 . . . C5 in the sequence S1. The detection process may occur 'on the fly' as the sequence S1 is being processed. In this case, a segment that is identified as a commercial segment is either omitted, i.e., it is not recorded, or is recorded and tagged appropriately.

Figure 3:
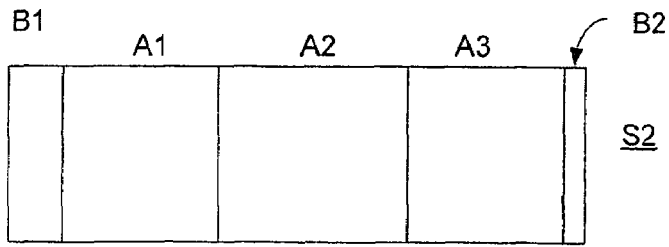
FIG. 3 shows a temporal sequence of the broadcast program of FIG. 1 with the commercials skipped automatically by the recording device of FIG. 2.

When a viewer elects to view the stored program without commercials, a program retriever 210 retrieves only the program segments, skipping the commercial segments. In other words, the recorder 200 outputs the program segments in a sequence S2 shown in FIG. 3, consisting only of segments A and B. Alternatively, as described in U.S. Patent Publication 2003/0202772, some of the commercial segments appearing within 30, 60 or 90 seconds of a program segment are left in the sequence S2 and are not skipped.

Figure 4:
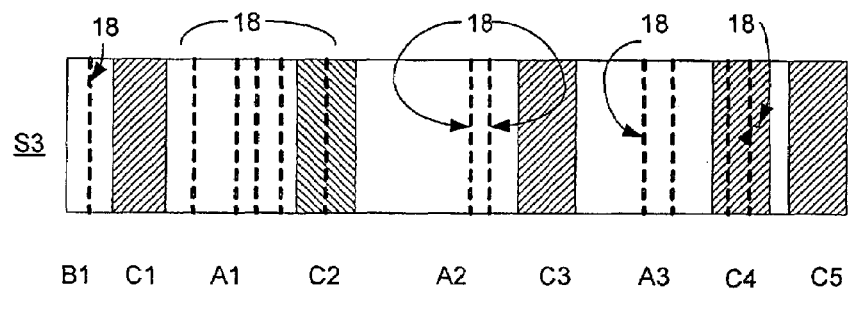
FIG. 4 shows a temporal sequence similar to the one in FIG. 1 with the extraneous signals added by the device of FIG. 6.

The present invention provides a broadcast program that has been modified to discourage commercial skipping. More particularly, as shown in FIG. 4, a broadcast program according to this invention includes a sequence of segments S3 in which at least some of the segments include extraneous signals 18 that mimic the segment dividers 16 but are actually imbedded within the program and/or commercial segments. The extraneous signals 18 typically may consist of black fields, although other segment dividers that mimic dividers 16 may also be used. Because these extraneous signals have very short durations, they are not detectible by a viewer. The temporal positions of these extraneous signals 18 are selected such that they are mistaken by the recorder 200 for true segment dividers. For example, the signals may be placed 15, 30, 60 or 90 seconds before and/or after an actual segment divider 16 adjacent to a commercial. Alternatively, or in addition, the signals 18 may also be dispersed randomly, within the program segments and/or the commercial segments.

When this broadcast program is received by recorder 200, because of the extraneous signals 18, the commercial detector 208 identifies the program and commercial segments incorrectly, so that, at least in some instances, they do not correspond to the actual program and commercial segments. Now, when the viewer elects to operate the recorder 200 to play the program without the commercials, the recorder will play a sequence of modified segments that are incomplete in that some portions of the program segments are cutoff and/or include at least part of the unwanted commercial segments. As a result, the viewer may become frustrated with the operation of the recorder 200 and will no longer operate the recorder 200 in an automatic commercial skipping mode.

Preferably, the extraneous signals 18 will be inserted by the producer of the broadcast program prior to the insertion of the commercials and/or distribution of the program for broadcast. After the program has been edited for broadcast, the producer would simply insert one or more extraneous signals into the program at either a fixed duration corresponding to a typical commercial length (e.g., 15, 30 or 60 seconds) before the end of a segment (A1, A2, A3, etc.) and/or a fixed duration after the commencement of such a segment. As discussed above, the extraneous signals may also be inserted randomly either in the program segments, the commercial segments, or both.

Figure 6:
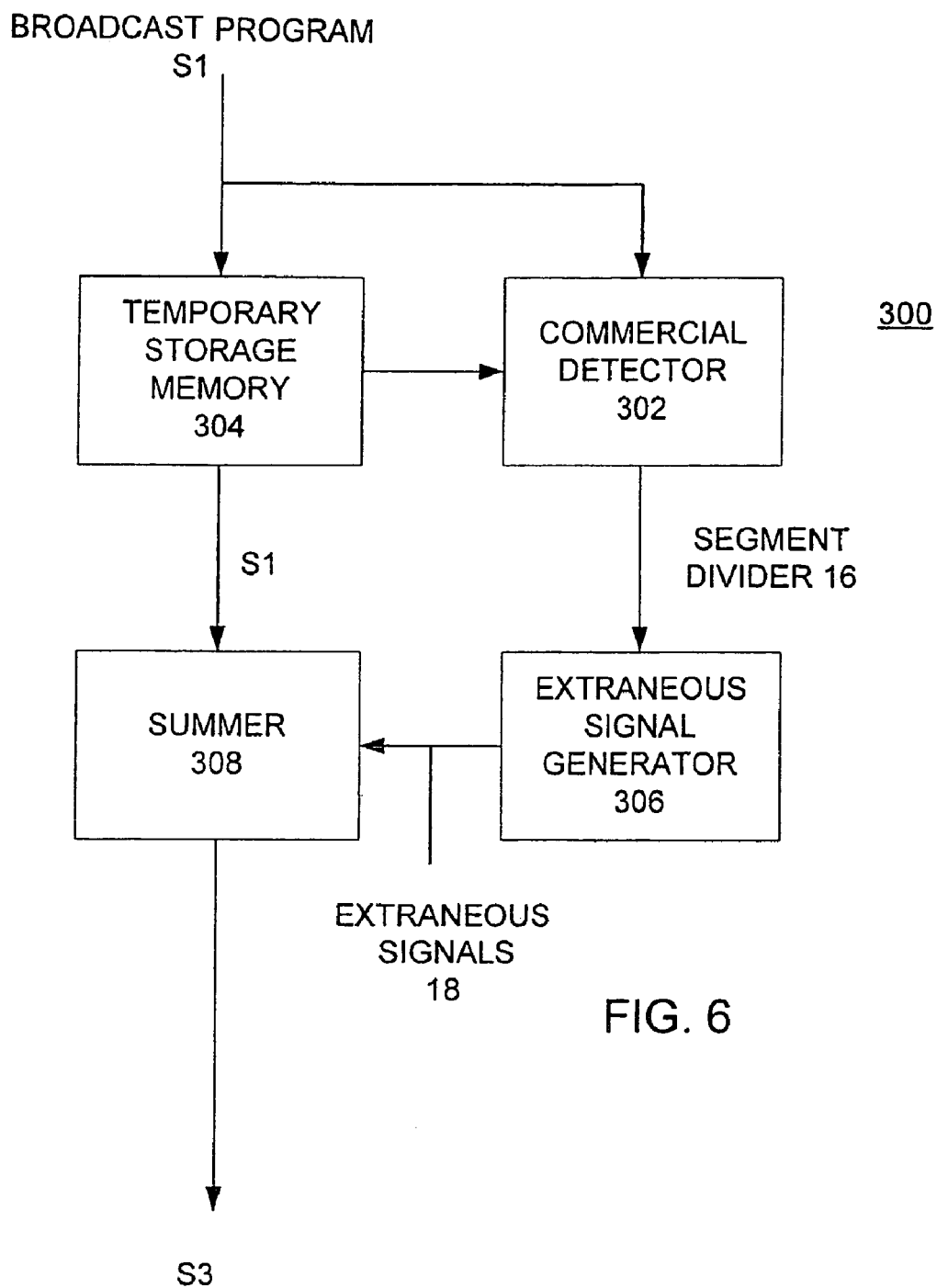
FIG. 6 shows a block diagram of a device used to insert extraneous signals in accordance with this invention.

Alternatively, the extraneous signals 18 can be inserted using a device such as that shown in FIG. 6. FIG. 6 shows a device 300 used to generate the sequence of segments S3 into which the extraneous segments 18 are inserted. The broadcast with its program and commercial segments S1 is fed to a commercial detector 302 and a temporary storage memory 304. The commercial detector 302 is used to detect the location of the segment dividers 16 in a manner similar to detector 208, and to use these dividers 16 to detect the program and commercial segments, as described above. If necessary, the detector 302 performs this function by reviewing the broadcast program after it has been stored in memory 304. Alternatively, the various segments of a broadcast program may be associated with a tag provided by the broadcaster, the tag identifying the segments as segments A1, B1, C1, etc.

Figure 5:
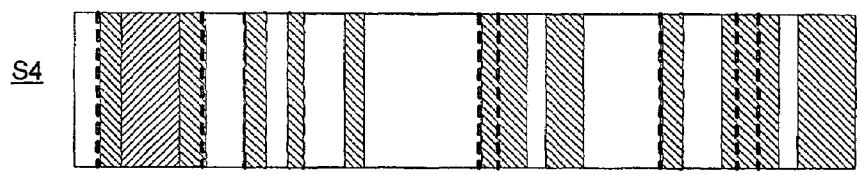
FIG. 5 shows the temporal sequence presented to the viewer, after the sequence of FIG. 4 is processed by the device of FIG. 2.

Next, generator 306 analyzes the program to determine the sequence of segments and generates the extraneous signals 18. The extraneous signals 18 are fed to a summer 308. Summer 308 adds the extraneous signals 18 to the segments of the broadcast program as shown in FIG. 4. The output of the summer is the series S3. As discussed above, the positions and characteristics of the extraneous signals 18 are selected so that they are erroneously recognized by known recorders, such as recorder 200, as segment dividers 16 as shown in FIG. 5.

Sometimes black fields may be too short to be detected properly. In these instances, other techniques may be used to detect segment dividers. In addition, some recording devices may rely upon the presence of a plurality of indicia indicating the presence of commercial segments in order to perform skipping, and may ignore one indicia that does not correspond to the others. To discourage commercial skipping in such devices, one or more different types of extraneous signals may need to be inserted. For example, segment dividers may be detected from abrupt changes in the average amplitude of the audio portion of the program, drop outs in the closed-caption (CC) signals, dropouts in the SAP signal, changes in the image color level and other similar segment delineation means. In these cases, the extraneous signals consist of, or define frames with dropouts in the CC or SAP signals, changes in the changes in the image color level, etc. In this manner, the extraneous signals again mimic segment dividers. Moreover, in order to discourage commercial skipping in systems that rely upon multiple indicia of the presence of segment dividers, or to protect against a range of different systems that may each rely upon the presence of a different indicia, the extraneous signals may include two or more such techniques for mimicking segment dividers.

Some digital programs may include a plurality of metatags that identify segment dividers. These metatags are used to identify the beginning and end of each segment, or the beginning and end of a group of segments. The metatags can be detected by the recorder (for example, through an electronic program guide) and used for commercial skipping. For these systems, the extraneous signals consist of metatags that are attached to various frames of one or more segment to flag incorrectly or mimic one or more segment dividers. Such extraneous signal metatags may either supplement preexisting metatags or replace preexisting metatags. The extraneous signal metatags can also be inserted where no metatags previously existed which may be effective in systems where the recorder is programmed so that it looks first for such metatags in performing commercial skipping.

Numerous modifications maybe made to this invention without departing from its scope as defined in the appended claims.

I claim:

1. A method of discouraging commercial skipping in a program broadcast as a sequence of segments including program segments, and commercial segments separated by segment dividers, said segment dividers having a divider characteristic, each segment being provided between two respective segment dividers, by a player adapted to detect at least one of said segment dividers and to skip a corresponding commercial segment, said method comprising inserting in said program a plurality of extraneous signals having said divider characteristic, each of said extraneous signals being inserted within one of said segments, wherein when said player receives said program, said player detects one of said extraneous signals erroneously as a segment divider and skips at least one of a portion of a program segment and a commercial segment.

2. The method of claim 1 wherein said extraneous signals are inserted at predetermined intervals preceding or succeeding respective segment dividers.

3. The method of claim 2 wherein said predetermined intervals are selected from 15, 30, 45 and 60-second intervals.

4. The method of claim 2 wherein said predetermined intervals are selected from the intervals of succeeding respective segment dividers.

5. The method of claim 1 wherein said extraneous signals are black fields.

6. The method of claim 1 wherein said extraneous signals include at least one of a change in the sound level, a change in the CC signals, a change in the SAP signals and a change in the video signals.

7. The method of claim 1 wherein said extraneous signals include metatags associated with said segments.

8. A method of generating a program received by a player adapted to skip commercials using segment dividers, said method comprising providing a sequence or program segments, commercial segments and segment dividers delimiting said program and commercial segments; and inserting in at least one of said program and commercial segment an extraneous signal that does not delimit one of said program segments from one of said commercial segments, said extraneous signal having characteristics selected to discourage recording the program without said commercial segments, said segment dividers and said extraneous signal having the same characteristics, wherein when said player receives said program, said player misinterprets an extraneous signal as a segment divider and skips one of an incomplete portion of a program segment and a portion of a commercial segment.

9. The method of claim 8 wherein said extraneous signal is selected from black field frames, changes in visual levels, changes in audio level, changes in CC content, changes in SAP content and metatags.

10. The method of claim 8 wherein said extraneous signal is inserted at a predetermined interval before or after one of said segment dividers.

11. The method of claim 8 wherein said extraneous signal is inserted randomly.

12. The method of claim 8 wherein said extraneous signal is not inserted within a predetermined interval before or after one of said segment dividers.

13. A computer readable medium storing a program when executed by a processor, performs the methodology recited in claim 1, the program comprising:

a sequence of a plurality of program segments, a plurality of commercial segments, segment delimiting means for defining boundaries between consecutive program and commercial segments; and extraneous signal means inserted in at least one of said program and commercial segments for discouraging recording of the program by a commercial skipping recorder, said extraneous signal means having the same characteristics as said segment delimiting means;

wherein said extraneous signal means does not delimit any one of said program segment from any one of said commercial segments; and wherein when the player receives the program, the player misinterprets an extraneous signal for a segment divider and skips a portion of a commercial segment or program segment.

14. The computer readable medium storing the program of claim 13 wherein said segment delimiting means comprise black fields.

15. The computer readable medium storing the program of claim 13 wherein said extraneous signal means is inserted at predetermined intervals within said program.

16. The computer readable medium storing the program of claim 15 wherein said extraneous signal means is inserted at predetermined intervals with respect to said segment delimiting means.

17. The computer readable medium storing the program of claim 13 wherein said extraneous signal means includes one of a change in color level, change in sound level, change in a CC signal and change in an SAP signal.

18. The computer readable medium storing the program of claim 13 wherein said segment delimiting means and said extraneous signal means include metatags.

* * * * *